(12) United States Patent
Okada et al.

(10) Patent No.: US 8,194,517 B2
(45) Date of Patent: Jun. 5, 2012

(54) HOLOGRAM RECORDING AND REPRODUCING DEVICE AND METHOD FOR RECORDING HOLOGRAM

(75) Inventors: Hitoshi Okada, Chiba (JP); Tomiji Tanaka, Saitama (JP); Takahiro Takeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/170,623

(22) Filed: Jun. 28, 2011

(65) Prior Publication Data

US 2011/0255391 A1 Oct. 20, 2011

Related U.S. Application Data

(63) Continuation of application No. 12/509,674, filed on Jul. 27, 2009, now Pat. No. 7,969,846.

(30) Foreign Application Priority Data

Aug. 27, 2008 (JP) ................................. 2008-217739

(51) Int. Cl.
 *G11B 11/00* (2006.01)
(52) U.S. Cl. ..................................... 369/53.26; 369/116
(58) Field of Classification Search .......................... None
 See application file for complete search history.

(56) References Cited

U.S. PATENT DOCUMENTS

| 7,502,297 | B2 | 3/2009 | Seko | |
|---|---|---|---|---|
| 2006/0114535 | A1 | 6/2006 | Sako | |
| 2007/0201339 | A1* | 8/2007 | Yaoita et al. | 369/103 |
| 2009/0040903 | A1 | 2/2009 | Tokuyama | |

FOREIGN PATENT DOCUMENTS

| JP | 03-179357 | 8/1991 |
|---|---|---|
| JP | 05-190971 | 7/1993 |
| JP | 2003-178484 | 6/2003 |
| JP | 2005-303129 | 10/2005 |
| JP | 2006-177995 | 7/2006 |
| JP | 2007-178780 | 7/2007 |

OTHER PUBLICATIONS

Tanaka et al., "Littrow-type external-cavity blue laser for holographic data storage", Appl. Opt. vol. 46 No. 17, pp. 3583-3592 (Jun. 10, 2007).

* cited by examiner

*Primary Examiner* — Paul Huber
(74) *Attorney, Agent, or Firm* — Robert J. Depke; Rockey, Depke & Lyons, LLC

(57) ABSTRACT

A hologram recording and reproducing device controls an optical beam output from an external cavity semiconductor laser to improve a diffraction efficiency. The hologram recording and reproducing device includes an external cavity laser, a photodiode, a laser drive circuit and a laser diode controller. The external cavity laser has a laser diode adapted to emit an optical beam that is used to generate data light and reference light with which a hologram recording medium is irradiated. The photodiode detects the amount of the optical beam output from the external cavity laser. The laser drive circuit supplies a current to the external cavity laser. The laser diode controller controls the laser drive circuit to ensure that a value obtained by integrating the detected intensity of the optical beam with respect to time over a predetermined period is equal to predetermined recording energy.

4 Claims, 11 Drawing Sheets

HOLOGRAM RECORDING AND REPRODUCING DEVICE AND METHOD FOR RECORDING HOLOGRAM

The subject matter of application Ser. No. 12/509,674 is incorporated herein by reference. The present application is a Continuation of U.S. application Ser. No. 12/509,674, filed Jul. 27, 2009, which claims priority to Japanese Patent Application JP 2008-217739 filed in the Japanese Patent Office on Aug. 27, 2008, the entire contents of which are hereby incorporated by reference.

BACKGROUND OF THE INVENTION

1. Field of the Invention

The present invention relates to a hologram recording and reproducing device and a method for recording a hologram.

2. Description of the Related Art

In recent years, a hologram recording and reproducing device has attracted attention as a data storage device. To record a hologram, reference light and data light are generated from laser light output from a single light source. In this case, the data light is modulated on the basis of recorded data. A hologram recording medium is irradiated with the reference light and the data light. The reference light and the data light interfere with each other in the hologram recording medium to form the hologram (diffraction grating). The hologram is recorded in the hologram recording medium. The recorded hologram includes a large amount of information. To reproduce the recorded information from the hologram recording medium, the hologram is irradiated with the reference light to ensure that reproduction light (diffracted light) is generated. The reproduction light is received by an imager having light receiving elements two-dimensionally arranged. Then, signal processing is performed on the reproduction light to reproduce the recorded data.

In the aforementioned case, the data light and the reference light are generated by an optical unit having optical elements, and the reproduction light is received by the optical unit. A certain optical unit has a common optical path through which data light and reference light pass. That is, the certain optical unit has a coaxial interference system (refer to Japanese Patent Publication No. 2003-178484). In addition, another optical unit has an optical path through which data light passes and an optical path through which reference light passes. The two optical paths are different from each other. That is, the optical unit has a two-beam interference system. As an optical source that is adapted to generate an optical beam and used in a hologram recording and reproducing device, there is a proposed technique related to an external cavity laser that emits a blue optical beam (refer to Japanese Patent Publication No. 2006-177995). In addition, there is a proposed technique for recording a hologram under the condition that a hologram recording medium moves (refer to Japanese Patent Publication No. 2007-178780). Furthermore, recording and reproducing characteristics obtained when an external cavity semiconductor laser is used have been reported (refer to "T. Tanaka, K. Takahashi, K. Sato, R. Kasegawa, M. Toishi, K. Watanabe, D. Samuels, and M. Takeya, "Littrow-type external-cavity blue laser for holographic data storage," Appl. Opt. 46, 3583-3592 (2007)").

SUMMARY OF THE INVENTION

There has not been a thorough study on how an external cavity semiconductor laser is controlled in order to maintain a high diffraction efficiency of reproduction light generated from a formed hologram in the case where the external cavity semiconductor laser is used in a hologram recording and reproducing device.

The present invention provides a hologram recording and reproducing device for controlling an optical beam output from an external cavity semiconductor laser to improve a diffraction efficiency and a method for recording a hologram with an improved diffraction efficiency.

The hologram recording and reproducing device according to an embodiment of the present invention includes: an external cavity laser having a laser diode adapted to emit an optical beam that is used to generate data light and reference light with which a hologram recording medium is irradiated; a photodiode for detecting the amount of the optical beam emitted by the laser diode; a laser drive circuit for supplying a current to the laser diode; and a laser diode controller for controlling the laser drive circuit to ensure that a value obtained by integrating the detected intensity of the optical beam with respect to time over a predetermined period is equal to predetermined recording energy.

The method for recording a hologram according to an embodiment of the present invention includes the steps of: emitting, by means of a laser diode included in an external cavity laser, an optical beam that is used to generate data light and reference light with which a hologram recording medium is irradiated; detecting the amount of the optical beam emitted by the laser diode by means of a photodiode; supplying a current to the laser diode by means of a laser drive circuit; and controlling, by means of a laser diode controller, the laser drive circuit to ensure that a value obtained by integrating the detected intensity of the optical beam with respect to time over a predetermined period is equal to predetermined recording energy.

According to the embodiment of the present invention, the laser diode controller controls the laser drive circuit to ensure that the value obtained by integrating the detected of the optical beam with respect to time over the predetermined period is equal to the predetermined recording energy. Thus, the length of time to record a hologram in a hologram recording medium can be a predetermined value. In addition, the amount of the recording energy applied to the hologram recording medium can be a predetermined value.

According to the embodiment of the present invention, a hologram is recorded in the predetermined time period, and the predetermined recording energy is applied to the hologram recording medium. As a result, a high diffraction efficiency of the reproduction light generated from the formed hologram can be maintained.

BEST MODE FOR CARRYING OUT THE INVENTION

The following describes the best mode (embodiment) for carrying out the invention. The description is provided in the following order. (1) A coaxial interference system included in a hologram recording and reproducing device. (2) The structure of a hologram disc. (3) An action of an optical beam in the hologram disc. (4) The hologram recording and reproducing device. (5) Synchronization of an operation of a galvanometer mirror with opening and closing of a shutter. (6) An external cavity laser. (7) A recording laser according to the embodiment of the present invention. (8) A method for controlling the recording laser according to the embodiment.

The term of the "hologram recording and reproducing device" used in the following description includes three meanings. The first meaning is a hologram recording device that records a hologram in a hologram disc. The second meaning is a hologram reproducing device that reproduces information from the hologram recorded in the hologram disc. The third meaning is a hologram recording and reproducing device that records a hologram in a hologram disc and reproduces the hologram recorded in the hologram disc.

(Coaxial Interference System Included in Hologram Recording and Reproducing Device)

Figure 1:
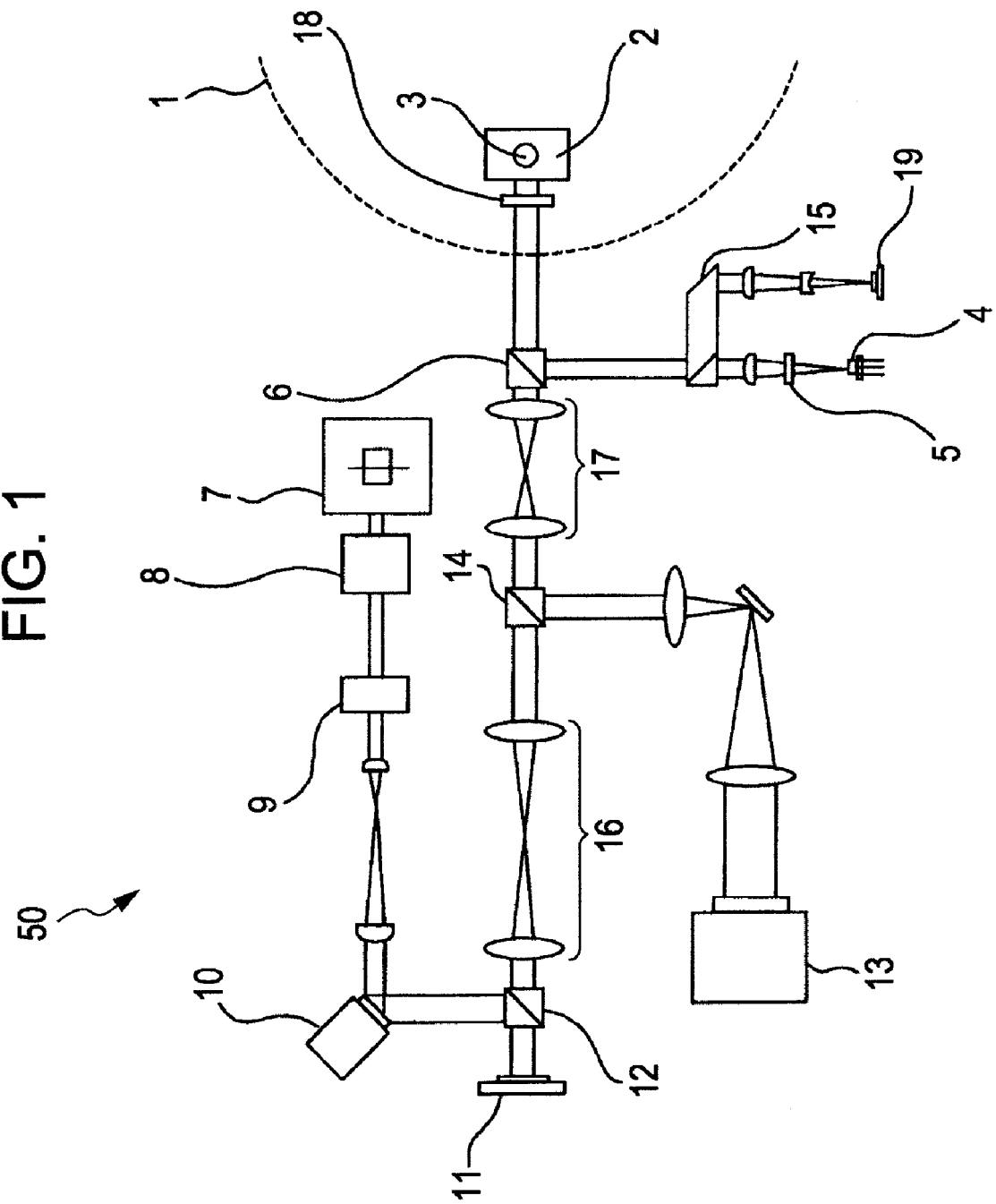
FIG. 1 is a schematic diagram showing an optical unit that has a coaxial interference system and is included in a hologram recording and reproducing device.

FIG. 1 is a schematic diagram showing an optical unit 50 that is the coaxial interference system included in the hologram recording and reproducing device. The optical unit 50 has a recording/reproducing optical system (blue laser system) for recording and reproducing holographic data in and from a hologram disc 1. The hologram disc 1 is a hologram recording medium. The optical unit 50 also has a servo optical system (red laser system). The servo optical system specifies a region of the hologram disc 1 in order to record a hologram in the region of the hologram disc 1 and positions an optical beam in the specified region. In addition, the servo optical system specifies a region of the hologram disc 1 in order to reproduce a hologram from the region of the hologram disc 1 and positions an optical beam in the specified region.

The blue laser system is an optical system that includes optical members adapted to transmit or reflect a blue laser beam (blue optical beam). The blue optical beam is used to record and reproduce a hologram. The recording laser is denoted by reference numeral 7. The blue optical beam is output from the recording laser 7. The red laser system is an optical system that includes optical members adapted to transmit or reflect a red laser beam (red optical beam). The red optical beam is used for a servo operation. The red optical beam is output from a servo laser 4. The recording laser 7 has a characteristic configuration specific to the embodiment, and is described later in detail.

Parts of the optical members are adapted to transmit or reflect both the blue optical beam and the red optical beam. The optical members that transmit or reflect both the blue optical beam and the red optical beam are a dichroic prism 6, a $\lambda/4$ plate (¼ wavelength plate) 18 and an objective lens 3. The blue optical beam and the red optical beam pass through a single optical path or are reflected in the single optical path. Thus, the servo operation (positioning operation) can be performed by means of the red optical beam, while a hologram can be recorded and reproduced in and from the hologram disc 1 by means of the blue optical beam. The hologram disc 1 has a recording layer 32 (refer to FIG. 2). Optical characteristics of the recording layer 32 are not changed by the red optical beam. Therefore, recording and reproducing characteristics of the hologram disc 1 are not affected by the servo operation.

The servo optical system has the following optical members, and the red optical beam is transmitted or reflected by each of the optical members in the following way. The red optical beam output from the servo laser 4 is divided into three optical beams by a grating 5. The three optical beams pass through a beam splitter 15 and are reflected by the dichroic prism 6. The three optical beams are then incident on the objective lens 3. The objective lens 3 focuses the optical beams to irradiate the hologram disc 1 with the focused optical beams. In this case, the servo optical system operates in order to focus the optical beams on a predetermined region of the hologram disc 1. The servo optical system is described later.

The recording/reproducing optical system (blue laser system) has the following optical members, and the blue optical beam is transmitted or reflected by each of the optical members in the following way. The blue optical beam output from the recording laser 7 passes through an isolator 8, a shutter 9 and the like, and is incident on a galvanometer mirror 10. The galvanometer mirror 10 scans the blue optical beam. The scanned blue optical beam is reflected by a polarizing beam splitter (PBS) 12 and incident on a spatial modulator 11. The spatial modulator 11 modulates the incident blue optical beam to generate data light and reference light. The data light and the reference light pass through the PBS 12. Then, the data light and the reference light pass through a relay lens 16, a polarizing beam splitter (PBS) 14 and a relay lens 17 and are incident on the dichroic prism 6.

The dichroic prism 6 has an optical film formed thereon to reflect the red optical beam and transmit the blue optical beam. Thus, the blue optical beam passes through the dichroic mirror 6. The blue optical beam passes through the $\lambda/4$ plate 18 and is focused by the objective lens 3. The hologram disc 1 is then irradiated with the blue optical beam. The data light and the reference light interfere with each other in the recording layer 32 (refer to FIG. 2) to ensure that a hologram is recorded in the recording layer 32.

(Structure of Hologram Disc)

Figure 2:
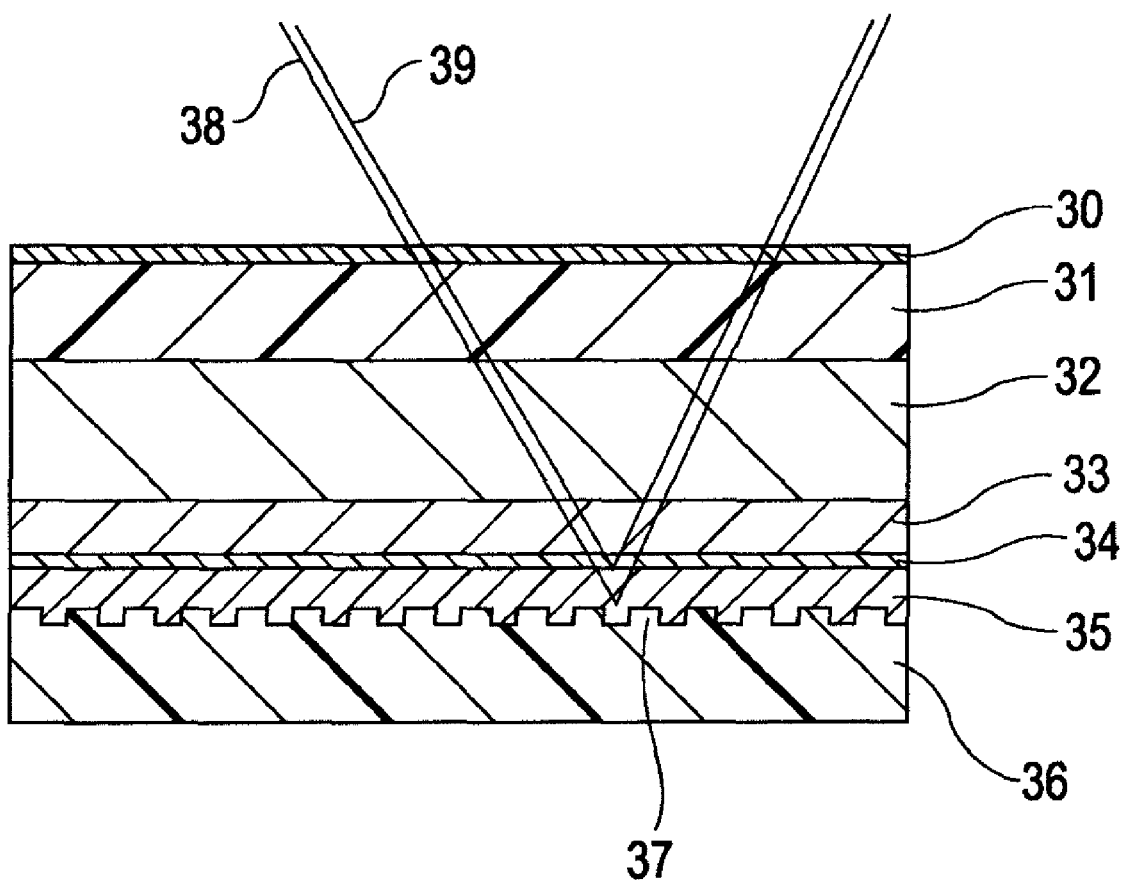
FIG. 2 is a schematic diagram showing the structure of a hologram disc.

FIG. 2 is a schematic diagram showing the structure of the hologram disc 1. The hologram disc 1 has an antireflective film 30, a plastic substrate 31, the recording layer 32, a gap layer 33, a wavelength selection film 34, a gap layer 35 and a plastic substrate 36, which are laminated. The plastic substrate 31 has a thickness of 0.6 millimeters. The recording layer 32 has a thickness of 0.6 millimeters as a typical example. The gap layer 33 has a thickness of 0.1 millimeters as a typical example. The gap layer 35 has a thickness of 0.1 millimeters as a typical example. Address grooves, track grooves and the like are provided on an interface between the gap layer 35 and the plastic substrate 36. An aluminum reflective film is provided on the interface on which the address grooves, the track grooves and the like are provided. The aluminum reflective film, the address grooves and the track grooves constitute the interface and are collectively denoted by reference numeral 37 as shown in FIG. 2.

(Action of Optical Beam in Hologram Disc)

A servo beam 38 shown in FIG. 2 schematically indicates a single red optical beam. The hologram disc 1 is irradiated with the red optical beam coming from the objective lens 3. The servo beam 38 passes through the antireflective film 30, the plastic substrate 31, the recording layer 32 and the gap layer 33. The servo beam 38 then reaches the wavelength selection film 34. The wavelength selection film 34 transmits or reflects an optical beam depending on the wavelength of the optical beam. The wavelength selection film 34 transmits the red optical beam. Thus, the servo beam 38, which is the red optical beam, passes through the wavelength selection film 34. The servo beam 38 then passes through the gap layer 35 and is reflected on the interface 37 (constituted by the aluminum reflective film, the track grooves and the address grooves). In this case, the servo beam 38 is modulated on the basis of the shapes of the address and track grooves formed on the interface 37 (constituted by the aluminum reflective film, the track grooves and the address grooves) and retrieves servo information.

The servo beam 38 reflected on the interface 37 (constituted by the aluminum reflective film, the track grooves and the address grooves) passes through the gap layer 35, the wavelength selection film 34, the gap layer 33, the recording layer 32, the plastic substrate 31 and the antireflective film 30 and reaches the objective lens 3. The servo beam 38 coming from the objective lens 3 is reflected by the dichroic prism 6, reflected by the beam splitter 15, and incident on a photodetector (PD) 19. The photodetector 19 obtains a servo error signal that is similar to a servo error signal detected from an optical disc such as a digital versatile disc. For example, a focus error signal can be obtained by an astigmatic method, and a tracking error can be obtained by a push-pull method.

A recording beam 39 shown in FIG. 2 schematically indicates a single blue optical beam. The recording beam 39 is the blue optical beam coming from the objective lens 3 and includes the data light and the reference light. The hologram disc 1 is irradiated with the recording beam 39. The recording beam 39 then passes through the antireflective film 30 and the plastic substrate 31 and reaches the recording layer 32. The data light and the reference light interfere with each other in the recording layer 32 to form an interference fringe. The interference fringe is recorded as a hologram.

To reproduce the hologram, the reference light travels in the same path as that of the recording beam 39, and the hologram disc 1 is irradiated with the reference light as shown in FIG. 2. The reference light then passes through the antireflective film 30 and the plastic substrate 31 and reaches the recording layer 32. The hologram recorded in the recording layer 32 is irradiated with the reference light to ensure that reproduction light (diffracted light) is generated. Since the reproduction light is a blue optical beam, the reproduction light is reflected by the wavelength selection film 34, and retrieves information recorded in the hologram.

The reproduction light reflected by the wavelength selection film 34 passes through the gap layer 35, the wavelength selection film 34, the gap layer 33, the recording layer 32, the plastic substrate 31 and the antireflective film 30 and reaches the objective lens 3. The reproduction light coming from the objective lens 3 is reflected by the polarizing beam splitter 14 and incident on a complimentary metal oxide semiconductor (CMOS) imager 13 serving as an imaging device. The information recorded in the hologram can be read by processing an image of the reproduction light received by the CMOS imager 13.

(Hologram Recording and Reproducing Device)

Figure 3:
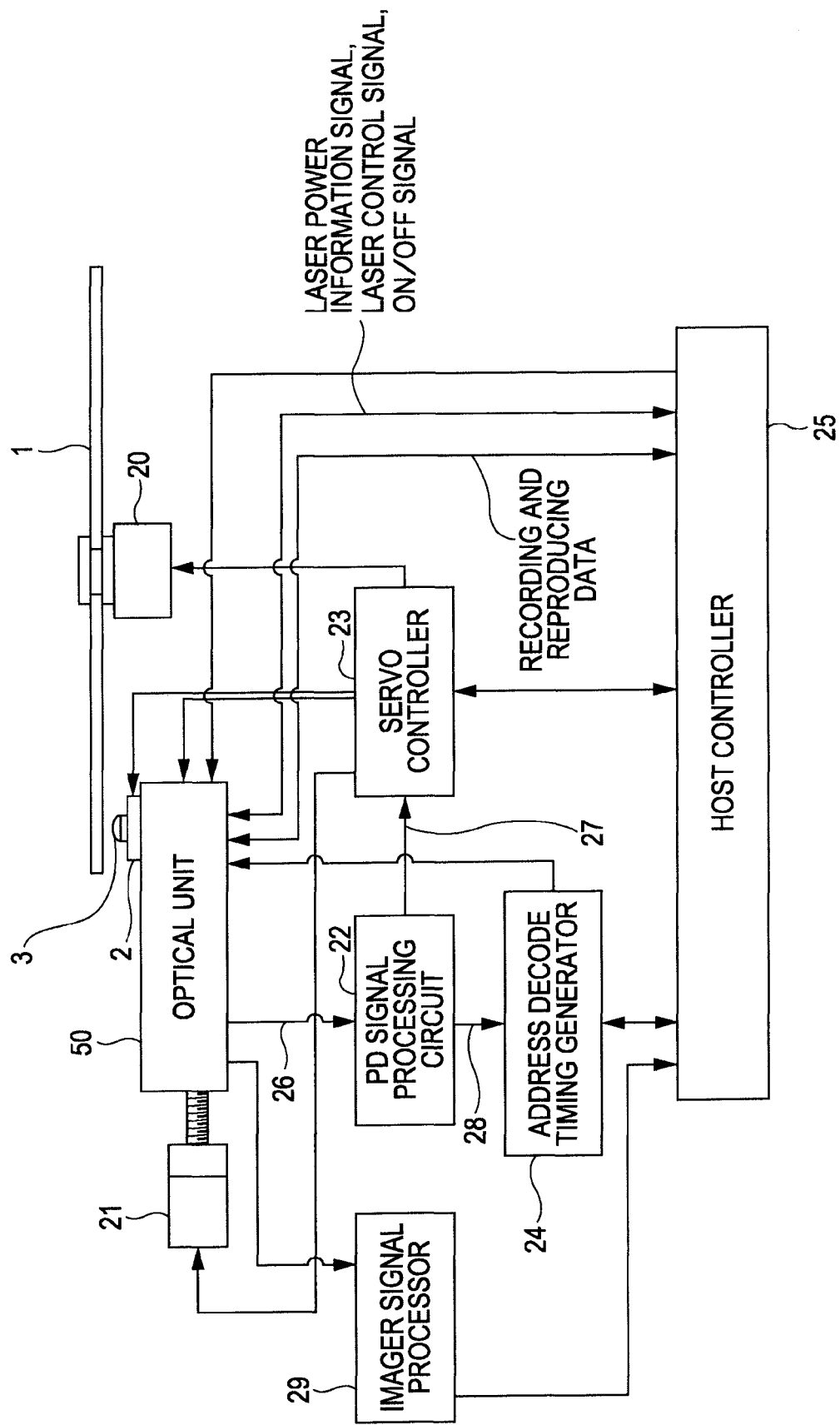
FIG. 3 is a schematic diagram showing the hologram recording and reproducing device.

FIG. 3 is a schematic diagram showing the hologram recording and reproducing device. The hologram recording and reproducing device has a spindle motor 20, a feed motor 21, a photodetector signal processing circuit 22, a servo controller 23, an address decode timing generator 24, a host controller 25 and an imager signal processor 29. The servo controller 23 controls a servo system of the hologram recording and reproducing device. The host controller 25 transmits and receives a signal to and from the servo controller 23. The host controller 25 transmits an instruction to the servo controller 23. In addition, the host controller 25 transmits and receives a signal to and from the address decode timing generator 24. Furthermore, the host controller 25 transmits and receives a signal to and from the optical unit 50.

The hologram disc 1 has a discoid shape and is mounted on a rotary shaft of the spindle motor 20. The servo controller 23 controls a rotation of the spindle motor 20. As a result, a rotation of the hologram disc 1 is controlled by the servo controller 23. The servo controller 23 drives a servo actuator 2 to move the objective lens 3 in a focusing direction and in a tracking direction. In addition, the servo controller 23 moves the feed motor 21 in the tracking direction to perform a tracking servo operation in a range that is not covered by the movement of the objective lens 3.

The imager signal processor 29 processes the reproduction light received by the optical unit 50 and reproduces the data included in the reproduction light. The imager signal processor 29 transmits the data to the host controller 25. The photodetector 19 included in the optical unit 50 receives the red optical beam and generates a PD signal 26. The photodetector 19 transmits the PD signal to the PD signal processing circuit 22. The PD signal processing circuit 22 processes the PD signal 26. One piece of the information retrieved by the red optical beam is a track reproduction signal 28. The PD signal processing circuit 22 transmits the track reproduction signal 28 to the address decode timing generator 24. The address decode timing generator 24 then decodes address information from the received track reproduction signal 28 to specify a region of the interface 37 irradiated with the red optical beam. Specifying the region of the interface 37 irradiated with the red optical beam specifies a region of the recording layer 32 irradiated with the blue optical beam. The PD signal processing circuit 22 supplies a servo error signal 27 to the servo controller 23. The servo error signal 27 is another piece of the information retrieved by the red optical beam.

The address decode timing generator 24 transmits the decoded address information to the host controller 25. The host controller 25 receives the address information and outputs the address information to the servo controller 23. The servo controller 23 receives the address information. The servo controller 23 then controls each actuator on the basis of the address information to direct the red and blue optical beams to the specified region of the recording layer 32. The host controller 25 transmits and receives recording and reproducing data to and from the optical unit 50 to perform a recording operation and a reproducing operation. The host controller 25 receives laser power information (refer to FIG. 9) from the optical unit 50 and outputs laser control information (refer to FIG. 9) and an ON/OFF signal (refer to FIG. 9) to the optical unit 50.

The outline of the configuration and operations of the hologram recording and reproducing device is described above. The following describes main parts of the hologram recording and reproducing device according to the embodiment in detail.

(Synchronization of Operation of Galvanometer Mirror with Opening and Closing of Shutter)

Recording of holographic data is different from recording of data on a normal optical disc. To record holographic data, a page recording method is used. In the page recording method, data having a constant amount is recorded at one time. The galvanometer mirror 10 scans the blue optical beam to irradiate a certain region of the hologram disc 1 for a certain time under the condition that the hologram disc 1 is continuously rotated by means of the spindle motor 20. This technique is described in Japanese Patent Publication No. 2007-178780.

Only during the scanning of the blue optical beam by the galvanometer mirror 10, the shutter 9 is open to transmit the blue optical beam from the isolator 8 to the galvanometer mirror 10. The shutter 9 is closed to prevent the blue optical beam from reaching the galvanometer mirror 10 after the scanning is terminated and before the galvanometer mirror 10 returns to a position at which galvanometer mirror 10 performs the next scanning. In this case, the servo controller 23 controls the shutter 9 to ensure that the shutter 9 is closed.

Figure 4:
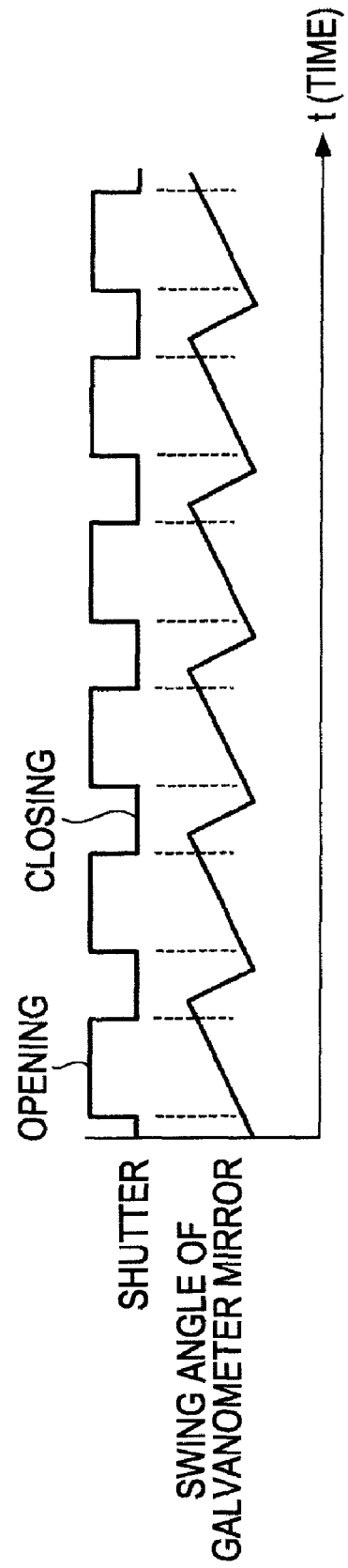
FIG. 4 is a diagram showing the relationship between opening and closing states of a shutter and a swing angle of a galvanometer mirror.

FIG. 4 shows the relationship of an opening state (in which the blue optical beam passes through the shutter 9) and closing state (in which the blue optical beam does not pass through the shutter 9) of the shutter 9 and a swing angle of the galvanometer mirror 10.

The hologram is recorded in the recording layer 32 of the hologram disc 1 in the following manner. The spatial modulator 11 displays a pattern in which the blue optical beam reflected by the spatial modulator 11 is represented by the data light and the reference light. The host controller 25 controls the spatial modulator 11 to ensure that the spatial modulator 11 displays the pattern.

To reproduce the hologram, the spatial modulator 11 displays a pattern in which the blue optical beam reflected by the spatial modulator 11 is represented only by the reference light. The host controller 25 controls the spatial modulator 11 to ensure that the spatial modulator 11 displays the pattern. As described above, when the hologram disc 1 is irradiated with the reference light, the reproduction light is generated from the recorded hologram and incident on the CMOS imager 13. In this case, the galvanometer mirror 10 and the shutter 9 are synchronously controlled as shown in FIG. 4 in the same manner as the synchronized operations performed during the recording.

(External Cavity Laser)

Figure 5:
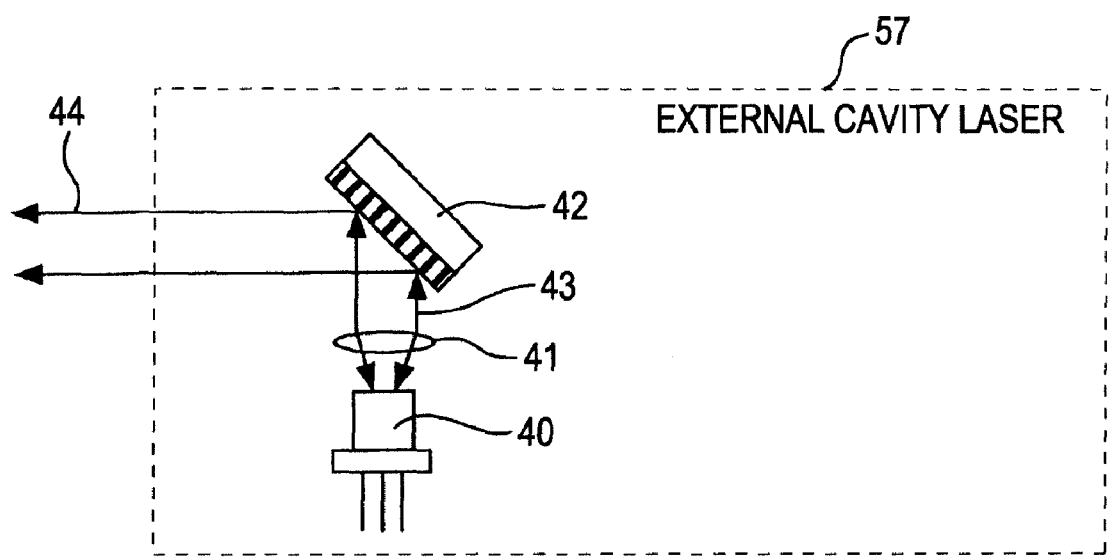
FIG. 5 is a diagram showing the configuration of an external cavity laser used in a recording laser according to an embodiment of the present invention.

FIG. 5 is a diagram showing the configuration of an external cavity laser 57 used in the recording laser 7 according to the embodiment. As the external cavity laser 57, a Littrow external cavity laser is used. The external cavity laser 57 includes a laser diode 40, a collimate lens 41, and a reflective diffraction grating 42. The laser diode 40 emits a blue optical beam. The blue optical beam emitted by the laser diode 40 is converted into parallel light by the collimate lens 41. The parallel light is then incident on the reflective diffraction grating 42. When the parallel light is reflected by the reflective diffraction grating 42, the parallel light is separated into zero order light 44 and primary light 43. The primary light 43 reflected and diffracted by the reflective diffraction grating 42 passes through the collimate lens 41 again and returns to the laser diode 40 as indicated by an arrow shown in FIG. 5. Due to the returned optical beam, a cavity is formed between the reflective diffraction grating 42 and the laser diode 40. The laser diode 40 oscillates at a wavelength determined on the basis of an angle of incidence of the light on the reflective diffraction grating 42. The zero order light 44 is reflected in a similar way to reflection on a normal mirror and diffracted by the reflective diffraction grating 42. The zero order light 44 is then output from the external cavity laser 57 as an optical beam to be used to record or reproduce a hologram.

Figure 6A:
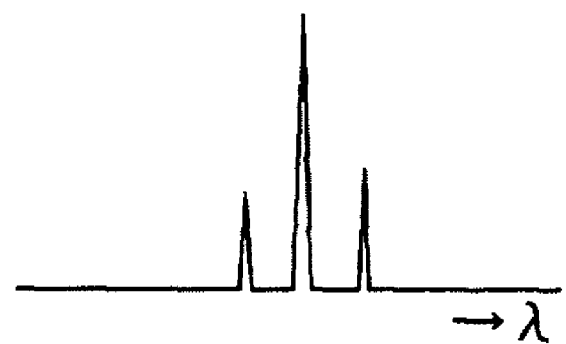
FIGS. 6A to 6C are diagrams each showing an oscillation wavelength spectrum of the recording laser.
Figure 6B:
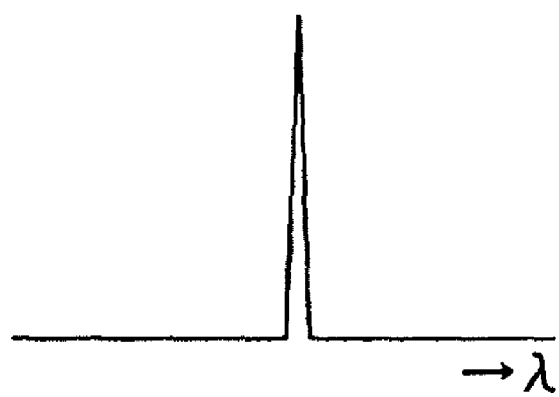
Figure 6C:
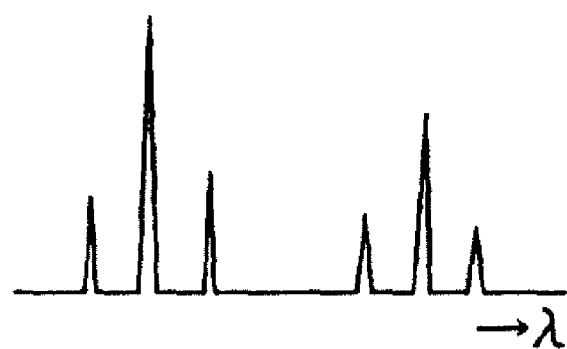

FIGS. 6A to 6C are diagrams each showing an oscillation wavelength spectrum of the external cavity laser 57 that constitutes a part of the recording laser 7. An oscillation wavelength spectrum of the optical beam emitted by the external cavity laser 57 indicates that the laser diode 40 oscillates at a substantially single wavelength in many cases. However, an oscillation mode of the laser diode 40 changes depending on the value of a current supplied to the laser diode 40 of the external cavity laser 57 and on an ambient temperature of the laser diode 40. FIG. 6A shows an oscillation mode in the case where the laser diode 40 oscillates at multiple wavelengths. FIG. 6B shows an oscillation mode in the case where the laser diode 40 oscillates at a single wavelength. FIG. 6C shows an oscillation mode in the case where the laser diode 40 oscillates at multiple wavelengths including two peak wavelengths. The laser diode 40 may oscillate in any of the oscillation modes shown in FIGS. 6A to 6C depending on the value of the current supplied to the laser diode 40 and on the ambient temperature of the laser diode 40. A mode hop means a high-speed transition between any two of the three wavelengths in the oscillation mode shown in FIG. 6A and a high-speed transition between any two of the six wavelengths in the oscillation mode shown in FIG. 6C.

Figure 7:
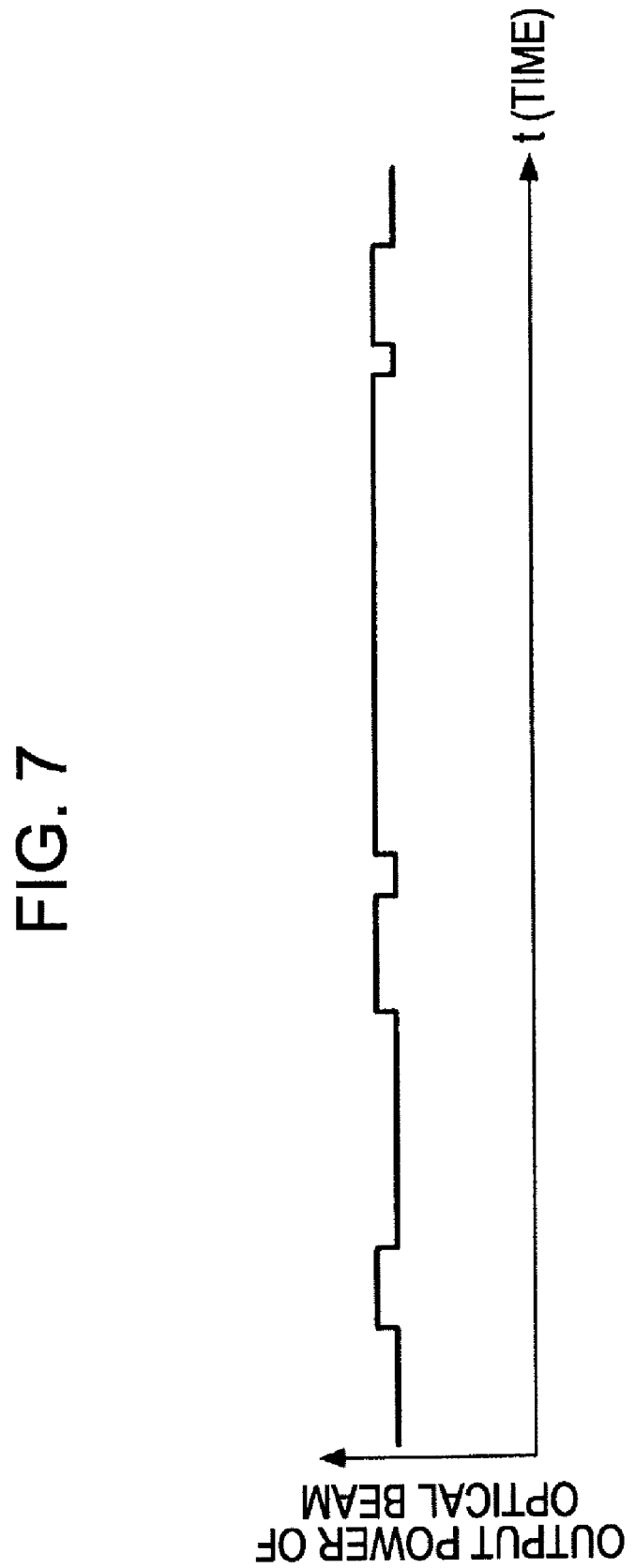
FIG. 7 is a schematic diagram showing a variation in output power of the optical beam output from the recording laser due to a mode hop.
Figure 8:
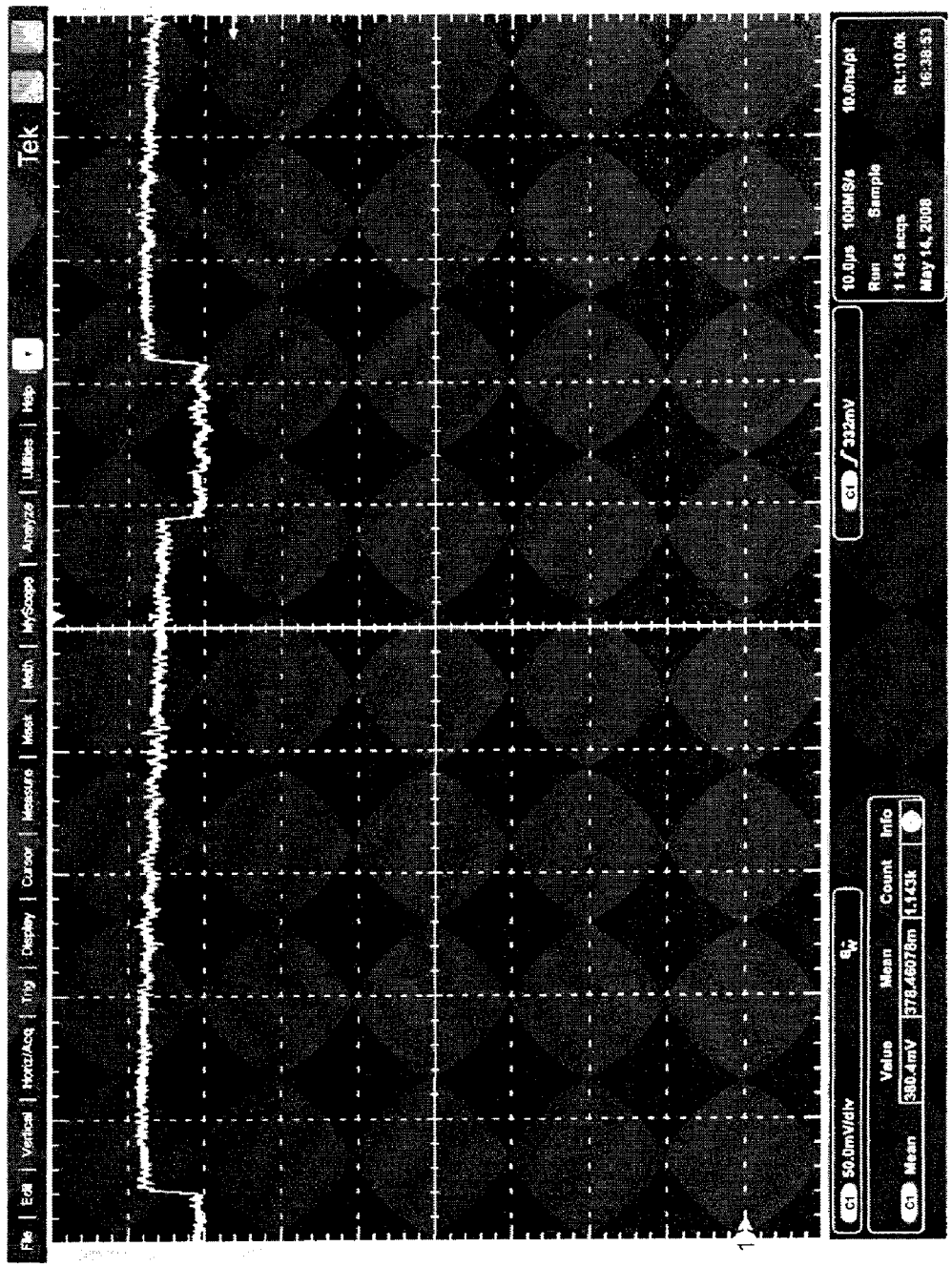
FIG. 8 is a picture of the screen of an oscilloscope displaying the variation in the optical power due to the mode hop.

FIG. 7 is a graph schematically showing a variation in output power of the optical beam output from the recording laser 7. The output power is plotted along an ordinate axis of the graph, while time is plotted along an abscissa axis of the graph. An experiment has confirmed that optical power of the zero order light output from the external cavity laser 57 varies up to approximately 7 percent. The variation of 7 percent in the optical power causes deficient exposure or excessive exposure for recording of a hologram. FIG. 8 is a picture of the screen of an oscilloscope displaying the variation in the optical power. As shown in FIG. 8, the variation in the optical power occurs for an extremely short time, e.g., 1 microsecond or less. It is difficult to suppress the variation in the optical power by means of a control circuit.

(Recording Laser According to the Embodiment)

Figure 9:
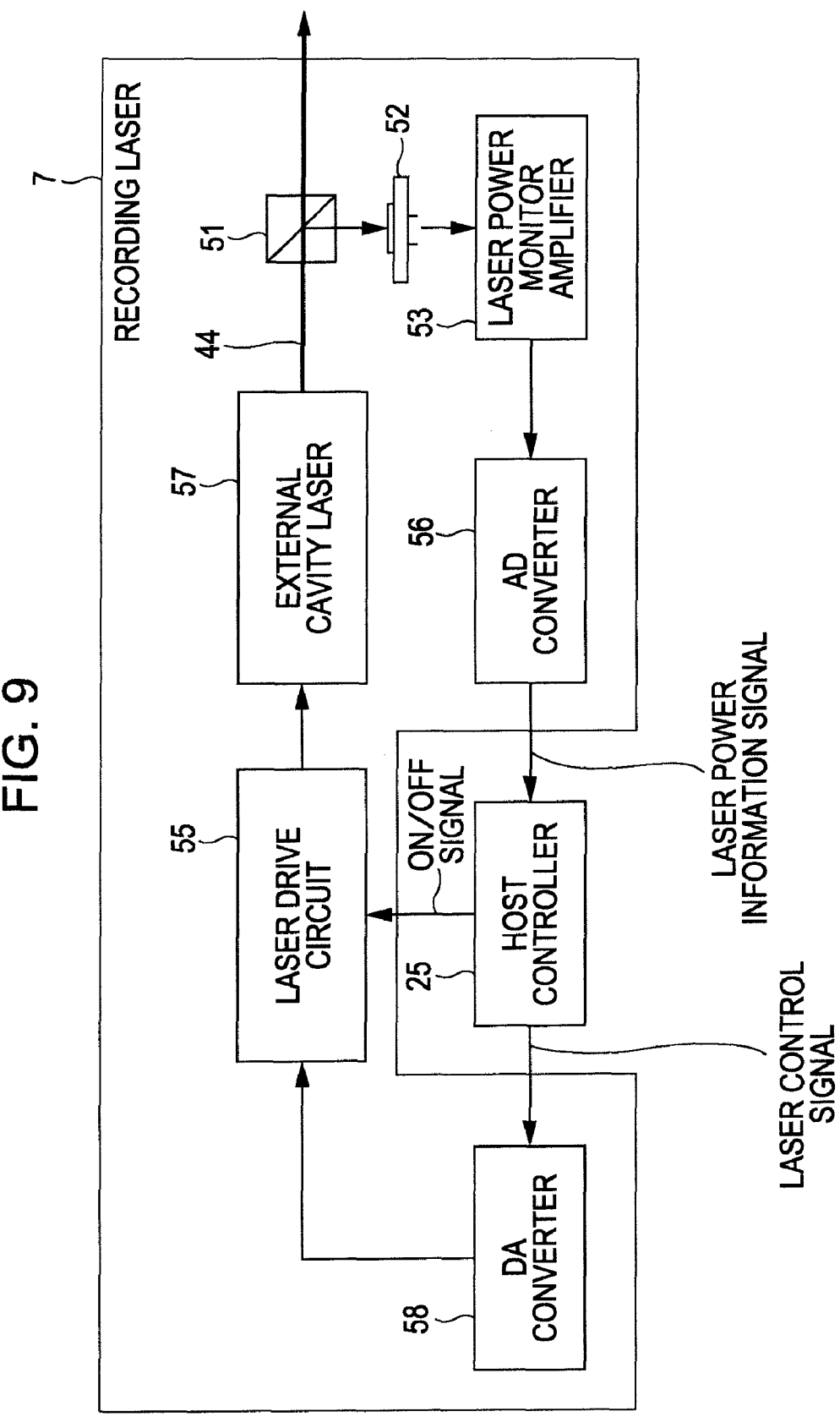
FIG. 9 is a diagram showing the configuration of the recording laser according to the embodiment.

FIG. 9 is a diagram showing the configuration of the recording laser 7 according to the embodiment. The recording laser 7 shown in FIG. 9 includes the littrow external cavity laser 57 (shown in FIG. 5), a beam splitter 51, a photodiode 52, a laser power monitor amplifier 53, an analog-to-digital (AD) converter 56, a digital-to-analog (DA) converter 58, and a laser drive circuit 55. The laser drive circuit 55 supplies a current to the external cavity laser 57 that is one type of laser diode. The host controller 25 serves as a laser diode controller for controlling the laser drive circuit 55. The laser drive circuit 55 is driven by means of an analog signal. Since the host controller 25 outputs a digital signal, the host controller 25 controls the laser drive circuit 55 via the DA converter 58.

The optical beam (zero order light) 44 output from the external cavity laser 57 is divided into two beams by the beam splitter 51. One of the two beams propagates straight and is used to record a hologram. The other of the two beams is reflected by the beam splitter 51 and incident on the photodiode 52. The photodiode 52 then outputs to the laser power monitor amplifier 53 a current whose amount is proportional to the amount of the optical beam incident on the photodiode 52. That is, the photodiode 52 detects the amount of the optical beam emitted by the laser diode. The laser power monitor amplifier 53 converts the current into a voltage. The voltage output from the laser power monitor amplifier 53 is proportional to the power of the optical beam detected by the photodiode 52 and proportional to the power of the optical beam to be used to record the hologram.

The AD converter 56 converts an analog value of the voltage output from the laser power monitor amplifier 53 into a digital value, and outputs the digital value to the host controller 25. The host controller 25 performs a calculation on the basis of the laser power information received from the AD converter 56 and on other information (e.g., information on an environmental temperature detected by a temperature sensor (not shown)) and outputs to the DA converter 58 the laser control information suitable for recording and reproducing the hologram. The host controller 25 outputs the ON/OFF signal to the laser drive circuit 55 to instruct the laser drive circuit 55 to supply a laser drive signal to the external cavity laser 57 and stop supplying the laser drive signal and thereby control the external cavity laser 57 to ensure that the external cavity laser 57 outputs the optical beam and stops outputting the optical beam. As described above, the red optical beam is used for the servo operation. Thus, the servo operation is maintained even when the external cavity laser 57 stop outputting the optical beam. When the shutter 9 is closed under the condition that the external cavity laser 57 outputs the optical beam, the blue optical beam does not reach the hologram disc 1. Even in this case, the servo operation is maintained.

(Method for Controlling Recording Laser According to the Embodiment)

As described above, the blue optical beam is divided into the reference light and the data light modulated on the basis of recorded data. The hologram disc 1 is irradiated with the reference light and the data light. The reference light and the data light interfere with each other in the recording layer 32 to form an interference fringe. The interference fringe is recorded as a hologram. As the recording layer 32, photosensitive monomer is used. The monomer is converted to polymer to form the hologram. The recorded hologram is reproduced by irradiating the hologram only with the reference light. The higher a diffraction efficiency determined on the basis of the quality of the recorded hologram, the greater a signal level of the reproduction light.

The diffraction efficiency is determined on the basis of energy (recording energy) of the optical beam with which the hologram disc 1 is irradiated for the recording of the hologram. The recording energy is represented by integrating laser power (that is the amount of the recording light) for the recording with respect to time. It is therefore necessary that the recording energy be controlled to ensure that the diffraction efficiency is optimal or maximal. The value of the recording energy when the diffraction efficiency is maximal is referred to as the optimal recording energy value.

The optimal recording energy value varies depending on a property of the medium having the recording layer 32 formed therein. However, the optimal recording energy value can be specified by specifying the type and temperature of the medium. In addition, the optimal recording energy value is represented by a value (integrated amount) obtained by integrating the intensity of the recording light with respect to time. The optimal recording energy value can be obtained by setting the amount of the integrated intensity to a pre-specified value. The following two methods are used to provide the optimal recording energy to the recording layer 32.

First Method

The intensity of the recording light used after the start of the recording is integrated. When the amount of the integrated intensity of the light reaches a preset level (corresponding to the optimal recording energy), the recording stops.

Second Method

The recording time (for which the recording layer 32 is irradiated with the reference light and the data light) is regarded as a predetermined time period that is a constant preset value. The power of the blue optical beam for the recording is controlled to ensure that the amount of the integrated intensity of the light reaches predetermined recording energy (referred to as the optimal recording energy) at the time of termination of the recording. The optimal recording energy is a constant preset value.

The recording time is controlled in the first method, while the amount of the recording light (which is the power of the blue optical beam) is controlled in the second method. In order to record a hologram in the hologram disc rotating at a constant rate, it is preferable that the opening and closing of the shutter, the galvanometer mirror, and the rotation of the hologram disc be synchronized. From the perspective of the synchronization, the second method is more suitable than the first method. The following describes the case where the second method is used.

The following formulas (1) and (2) are established, where $Ew$ is remaining recording energy; $Tw$ is a remaining exposure time; $Pw$ is recording power (power of the optical beam); and $Ts$ is a control interval (sampling time (cycle)).

$$Ew = Ew{-}1 - (Pw{-}1 \times Ts) \qquad \text{Formula 1}$$

The symbol $Ew{-}1$ indicates remaining recording energy at the time of the previous sampling, while the symbol $Pw{-}1$ indicates recording power at the time of the previous sampling.

$$Tw = Tw{-}1 - Ts \qquad \text{Formula 2}$$

The symbol $Tw{-}1$ indicates a remaining exposure time at the time of the previous sampling.

As a formula to represent recording energy to be set for the current sampling cycle, the following formula (3) is established. That is, when a hologram is recorded with the recording energy represented by the formula (3) in the remaining exposure time, the recording can be terminated in the predetermined time period, and the predetermined recording energy can be provided to the hologram disc 1.

$$Pw = Ew/Tw \qquad \text{Formula 3}$$

When the power of the optical beam represented by the formula (3) is used to represent the recording power used in the current sampling cycle and remaining sampling cycles, the recording power can be modified. In this way, the hologram can be recorded with the maximal diffraction efficiency.

Figure 10:
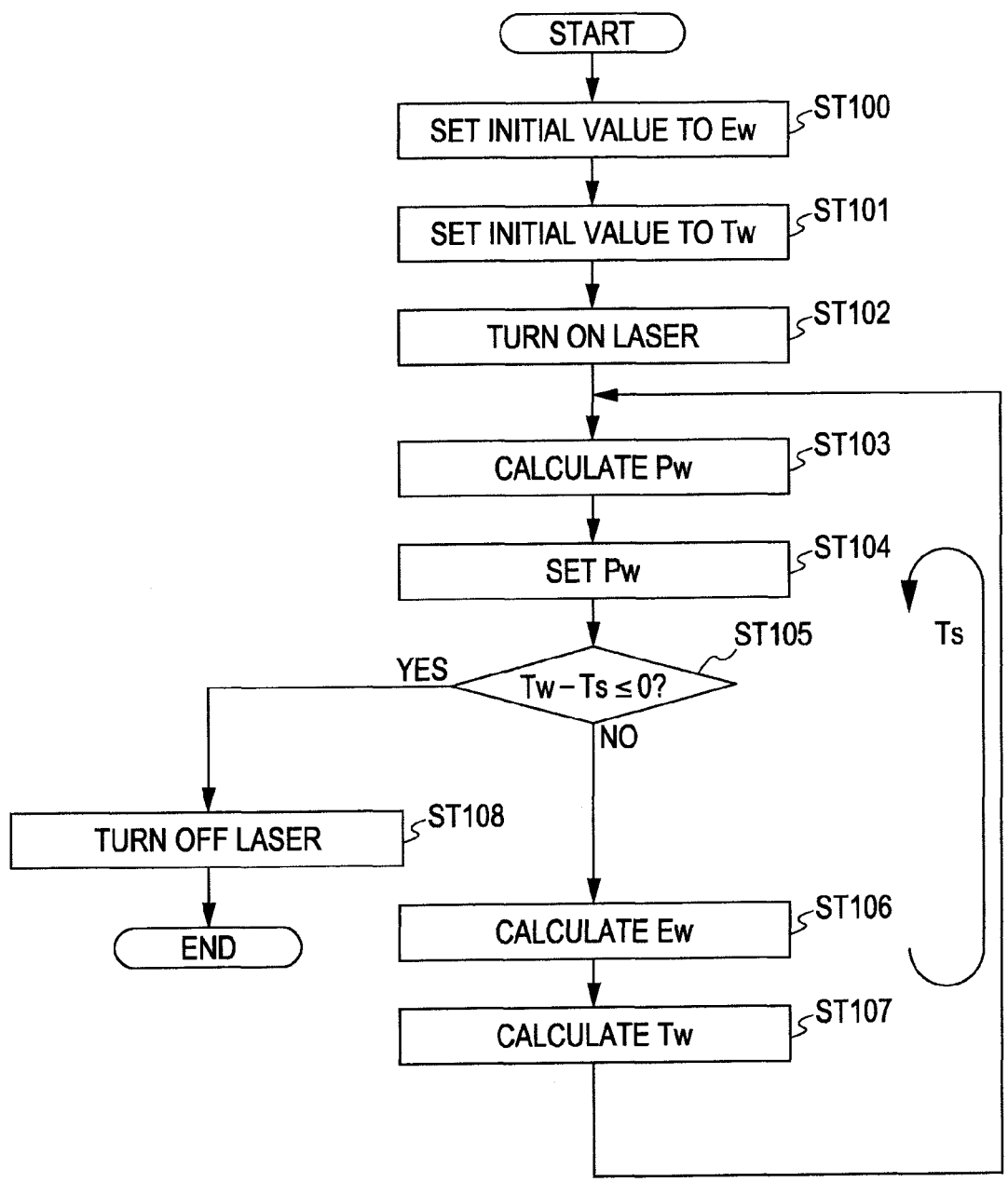
FIG. 10 is a flowchart of control of the recording laser according to the embodiment.

FIG. 10 is a flowchart of control of the recording laser according to the embodiment.

In step ST100, the host controller 25 sets, as an initial value of the remaining recording energy $Ew$, the recording energy (optimal recording energy) that leads to the maximal diffraction efficiency of the used recording medium (recording layer 32 of the hologram disc 1).

The optimal recording energy value is obtained through an experiment in advance.

In step ST101, the host controller 25 sets, as an initial value of the remaining exposure time $Tw$, the predetermined time period for which the used recording medium (recording layer 32 of the hologram disc 1) is irradiated with the optical beam. The predetermined time period is determined on the basis of the rotation rate of the spindle motor 20 and an interval between times when holograms are recorded.

In step ST102, the host controller 25 controls the ON/OFF signal to ensure that the recording laser 7 outputs the optical beam.

In step ST103, the host controller 25 calculates the formula (3) to obtain the recording power Pw.

In step ST104, the host controller 25 transmits a laser control signal to the DA converter 58 on the basis of the calculation result obtained in step ST103 and sets the recording power P.w.

In step ST105, the host controller 25 determines whether or not the value of (Tw−Ts) is equal to or less than zero. When the host controller 25 determines that the value of (Tw−Ts) is equal to or less than zero (or when the answer is Yes in step ST105), the process shown in FIG. 10 proceeds to step ST108. When the host controller 25 determines that the value of (Tw−Ts) is larger than zero (or when the answer is No in step ST105), the process shown in FIG. 10 proceeds to step ST106.

In step ST106, the host controller 25 calculates the remaining recording energy Ew. The remaining recording energy Ew is reduced from the initial value set in step ST100 when the process shown in FIG. 10 passes through step ST106. The process then proceeds to step ST107.

In step ST107, the host controller 25 calculates the remaining exposure time Tw. The remaining exposure time Tw is reduced from the initial value set in step ST101 when the process shown in FIG. 10 passes through step ST107. The process then proceeds to step ST103.

In step ST108, the host controller 25 turns off the recording laser 7 to prevent the hologram disc 1 from being irradiated with the optical beam output from the recording laser 7. The process is then terminated. The irradiation of the recording layer 32 with the blue optical beam can be started by turning on the recording laser 7 in step ST102. The irradiation of the recording layer 32 with the blue optical beam can be stopped by turning off the recording laser in step ST108. Thus, the recording time can be controlled without the shutter 9 in the process shown in FIG. 10.

A timer (not shown) or the like is provided in the host controller 25. The timer or the like is set to ensure that a time interval for which a loop of steps ST103 to ST107 is performed is equal to the sampling time Ts. The sampling time Ts is sufficiently smaller than a time necessary to record a hologram. The host controller 25 may perform the calculation processing in step ST103 when a timer interrupt occurs for each sampling time Ts, instead of using the timer or the like. The time length between the time when step ST103 is first performed and the time when step ST108 is performed is equal to the recording time (for which a hologram is recorded in the hologram disc 1) that is the predetermined time period. For example, the recording time is set equal to a time (shown in FIG. 4) for which the shutter 9 is in an opening state.

Figure 11:
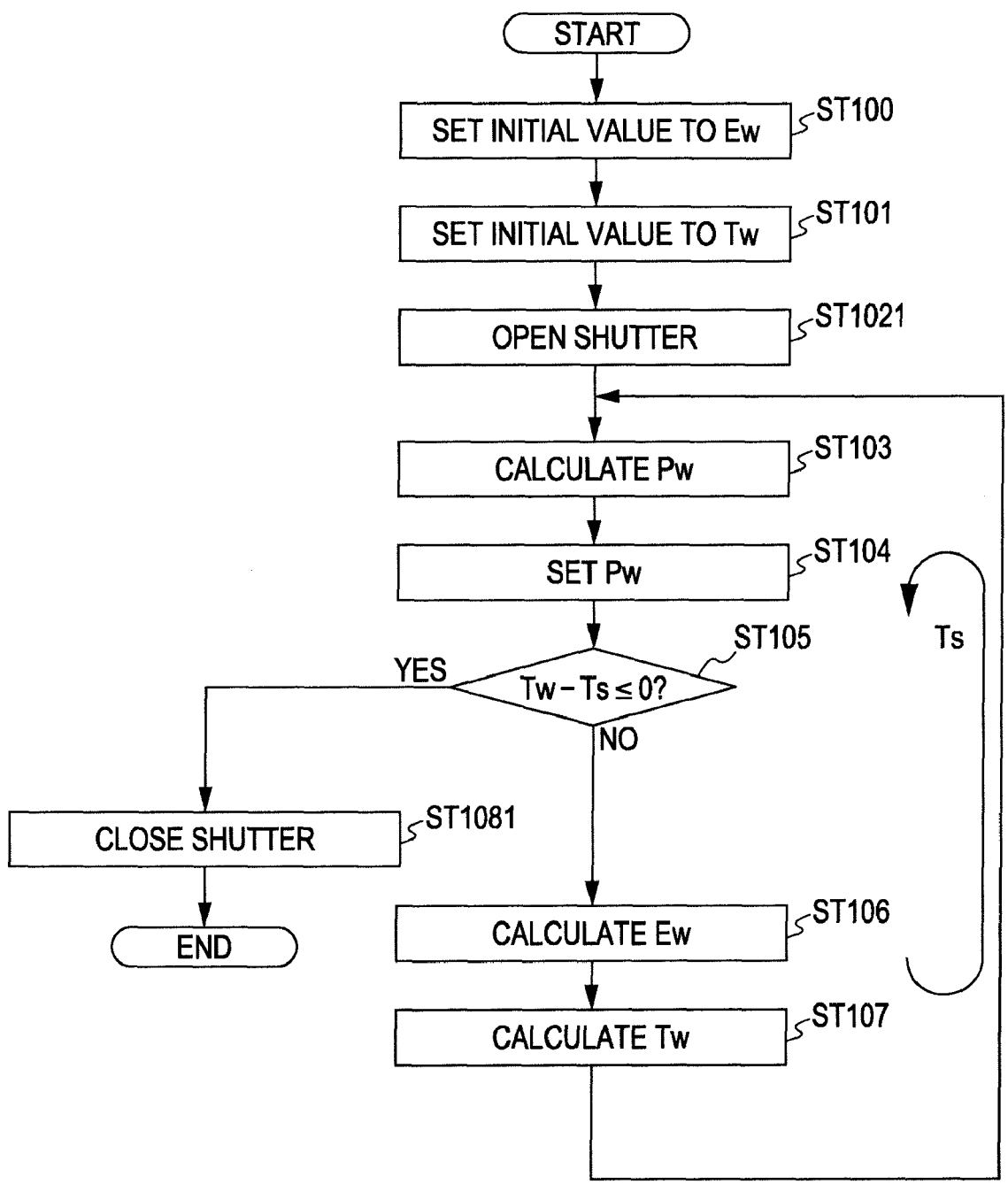
FIG. 11 is a flowchart of control of another recording laser according to the embodiment.

FIG. 11 is a flowchart of control of another recording laser according to the embodiment. In the flowchart shown in FIG. 11, step ST1021 is performed instead of step ST102 of the flowchart shown in FIG. 10, and step ST1081 is performed instead of step ST108 of the flowchart shown in FIG. 10. The other steps shown in FIG. 11 are the same as those shown in FIG. 10, and thus not described below.

In step ST1021, the shutter 9 is open. This results in the fact that the recording layer 32 is irradiated with the blue optical beam. In step ST1081, the shutter 9 is closed. This results in the fact that the irradiation of the recording layer 32 with the blue optical beam is stopped. In normal hologram recording, several hundred page data pieces (holograms) or more are recorded. In this case, one page data piece forms one hologram. As shown in the flowchart of FIG. 11, the recording laser 7 is turned on in order to start the recording, and the shutter 9 is open and closed for each page to record a hologram. After a series of operations for recording holograms is terminated, the recording laser 7 is turned off.

The control described above is summarized as follows. The remaining recording energy value and the remaining exposure time are calculated for each sampling time Ts. The recording power is determined on the basis of the calculated remaining recording energy value and the calculated remaining recording time, and the recording is performed with the determined recording power. Thus, the optimal recording can be performed in the predetermined recording time.

In general, any of the three oscillation modes shown in FIGS. 6A to 6C may occur in the external cavity laser 57 when the laser power is adjusted as described above. The oscillation mode shown in FIG. 6A is referred to as a single-oscillation mode. The oscillation mode shown in FIG. 6B is referred to as a three-oscillation mode. The oscillation mode shown in FIG. 6C is referred to as a six-oscillation mode. In the laser control method according to the embodiment, the laser power is adjusted while the recording time is fixed. Thus, any of the three oscillation modes (single-oscillation mode, three-oscillation mode and six-oscillation mode) may occur.

When a coaxial interference method is used, a hologram can be excellently recorded in any of the three oscillation modes. When a two-beam interference method is used, a hologram can be recorded in the single-oscillation mode and the three-oscillation mode. However, the aforementioned document, Littrow-type external cavity blue laser for holographic data storage, describes that a hologram may not be recorded in the six-oscillation mode when a two-beam interference method is used. According to the results of the experiment described in the present specification and conducted by the present inventors, when the length of a chip of the laser diode 40 included in the Littrow external cavity laser 57 is 1 millimeter or more and a two-beam interference method is used, a hologram can be recorded in a recording layer having a thickness of 1.5 millimeters in the six-oscillation mode.

The laser control method according to the embodiment can be used regardless of methods for recording holographic data including a recording method using a coaxial interference method and a recording method using a two-beam interference method.

In the laser control method according to the embodiment, even when it is necessary to specify the time necessary to record a hologram (for example, even when the laser control is synchronized with the angular velocity of the rotation of the spindle motor 20), the diffraction efficiency of the formed hologram is high. This feature is effective for a hologram recording and reproducing device that records a hologram under the condition that a disc-type hologram medium rotates.

In the laser control method according to the embodiment, the power of the optical beam output from the recording laser varies. The amount of the integrated intensity of the optical beam output from the recording laser significantly affects the formation of a hologram. Since the output power of the optical beam varies for the sampling time Ts, the change in the output power of the optical beam slightly affects the formation of the hologram. The laser diode easily transitions between any two of the oscillation modes shown in FIGS. 6A to 6C when the value of a current to be supplied to the laser diode is changed in order to change the output power of the optical beam. In this case, when a coaxial interference method is used, a high diffraction efficiency can be obtained. Even when a two-beam interference method is used, a high diffraction efficiency can be obtained by controlling the length of the chip of the laser diode.

The embodiment describes that the hologram recording medium is the hologram disc. In the laser control method according to the embodiment, a hologram recording medium having a square shape may be used.

The present application contains subject matter related to that disclosed in Japanese Priority Patent Application JP 2008-217739 filed in the Japan Patent Office on Aug. 27, 2008, the entire content of which is hereby incorporated by reference.

The present invention is not limited to the aforementioned embodiment and may be modified in various ways within the scope of the technical concept of the invention.

What is claimed is:

1. A hologram recording and reproducing device comprising:
   a laser diode adapted to emit an optical beam that is used to generate data light and reference light;
   a photodiode that detects an amount of light corresponding to the optical beam emitted by the laser diode;
   a laser drive circuit that supplies a current to the laser diode; and
   a laser diode controller that controls the laser drive circuit to ensure that a value obtained by integrating the detected intensity of the optical beam with respect to time over a predetermined period corresponds to a value that is equal to or greater than a predetermined recording energy.

2. The hologram recording and reproducing device according to claim 1, wherein
   the laser diode controller sets the predetermined recording energy as an initial value of remaining recording energy; sets the predetermined time period as an initial value of a remaining exposure time; calculates recording power by dividing the remaining recording energy by the remaining exposure time for each sampling time in order to supply a current corresponding to the calculated recording power to the laser diode; sets a value obtained by subtracting from the remaining recording energy a value obtained by integrating the intensity of the optical beam with respect to the sampling time as a new value of the remaining recording energy; sets a value obtained by subtracting the sampling time from the remaining exposure time as a new value of the remaining exposure time, and
   when the remaining exposure time becomes zero or less, the irradiation of the hologram recording medium with the data light and the reference light is stopped.

3. The hologram recording and reproducing device according to claim 2, wherein
   the length of a chip of the laser diode is 1 millimeter or more and set to allow the laser diode to emit a blue optical beam.

4. A method for recording a hologram comprising the steps of:
   emitting an optical beam that is used to generate data light and reference light with which a hologram recording medium is irradiated;
   detecting a signal corresponding to the amount of the optical beam emitted by the laser diode by means of a photodiode;
   supplying a current to the laser diode by means of a laser drive circuit; and
   controlling the laser drive circuit to ensure that a value obtained by integrating the detected intensity of the optical beam with respect to time over a predetermined period corresponding to a value that is equal to or greater than a predetermined recording energy.

* * * * *